US005662345A

United States Patent [19]

Kiewit

[11] Patent Number: 5,662,345

[45] Date of Patent: Sep. 2, 1997

[54] WHEELCHAIR WHEEL CAMBERING APPARATUS

[76] Inventor: David A. Kiewit, 5901 Third St. South, St. Petersburg, Fla. 33705

[21] Appl. No.: 520,831

[22] Filed: Aug. 29, 1995

Related U.S. Application Data

[63] Continuation-in-part of Ser. No. 312,531, Sep. 26, 1994, abandoned.

[51] Int. Cl.[6] .......................... B62M 1/14; B62D 17/00

[52] U.S. Cl. .......................... 280/250.1; 280/661

[58] Field of Search .......................... 280/250.1, 304.1, 280/647, 650, 657, 661; 180/907; 297/DIG. 4

[56] References Cited

U.S. PATENT DOCUMENTS

| | | | |
|---|---|---|---|
| 4,362,311 | 12/1982 | Bergman | 280/250.1 |
| 4,457,528 | 7/1984 | Ichikawa et al. | 280/250.1 |
| 4,506,901 | 3/1985 | Tosti | 280/250.1 |
| 4,758,013 | 7/1988 | Agrillo | 280/250.1 |
| 4,971,397 | 11/1990 | Nichols et al. | 301/110.5 |

*Primary Examiner*—Brian L. Johnson
*Assistant Examiner*—Victor E. Johnson
*Attorney, Agent, or Firm*—David Kiewit

[57] ABSTRACT

The main wheels of a wheelchair are attached to the chair at a predetermined one of a plurality of camber angles differing by one or more predetermined angular measure(s). The apparatus comprises a bracket extending from the wheelchair's frame as well as a plurality of axle retainers disposed about and juxtaposed along the stub axle, the retainers used to mount the axle in the bracket. Switching from a first of two predetermined camber angles to the second requires removing the axle and retainers from the bracket, translating the axle either inboard or outboard (i.e., either toward or away from the center of the chair) by a predetermined amount, and reattaching the wheel to the chair. The operation may also involve adjusting the length of one or more of the bracket legs. Switching between camber angles preferably does not affect the height of the chair's seat or the position of the top of the wheels relative to the user's shoulders.

13 Claims, 9 Drawing Sheets

WHEELCHAIR WHEEL CAMBERING APPARATUS

This application is a continuation-in-part of the inventor's U.S. application Ser. No. 08/312,531, which was filed on Sep. 26, 1994, and which is now abandoned.

BACKGROUND OF THE INVENTION

If the large main wheels of a wheelchair are in a vertical plane (i.e., set at a 0° camber angle) the track width is minimized. This makes it easier for the chair to pass through narrow doorways. If, on the other hand, the wheels are cambered outward at the base by some angle, the increased track width improves lateral stability, which allows for sharper turns. Although prior art wheelchairs have been made with adjustable camber angles, resetting the camber angle of a chair is at best a laborious operation requiring considerable mechanical aptitude, a selection of hand tools, and a safe place to keep small semi-custom hardware items. Most prior art chairs are made with a single camber angle that is not adjustable.

The prior art of making a wheelchair with an adjustable main wheel camber angle comprises at least the following:

A widely used receiving socket for a stub axle is designed to be bolted to a wheelchair frame with four bolts. Shims (e.g., washers placed around two of the four bolts) are used to tilt the socket about a horizontal axis.

Friedrich, in U.S. Pat. No. 4,768,797, teaches an axle-receiving socket tiltable to one of a predetermined number of angles. Friedrich provides a plurality of vertically disposed sets of mounting holes on the side of a socket assembly. The holes are aligned so each set provides a different camber angle, and so that the mounting point of the wheel system is translated outward as the camber angle increases, which ensures that the top of the wheel, where the wheelchair user grasps the push rim, stays in the same position relative to the user's body. Friedrich's mounting system provides only for relatively small (e.g., three degrees of arc) changes in camber angle.

McWehty, in U.S. Pat. No. 5,060,962, teaches an improvement to the receiving socket mentioned above. McWehty provides a receiving socket assembly comprising an angled cambering sleeve member.

Robertson et al, in U.S. Pat. No. 5,131,672, teach a chair with a large uncambered bore in its frame. Pairs of plugs, each with its own internal cambered axle-receiving socket, are plugged into the uncambered bore to set the wheel camber angle. Robertson et al also provide a useful review of the variety of camber angles commonly employed and of wheelchair sports for which various camber angles are commonly used.

The art of demountably attaching a wheel to a wheelchair is also relevant to the present invention, particularly as it relates to light, rigid frame chairs used by wheelchair athletes. These chairs are designed with readily demountable wheels so that when the occupant of the chair transfers to an automobile, the frame and the wheels are separated before being loaded into the car. Two methods of wheel attachment for these chairs are in common use:

A threaded stub axle is screwed into a socket on the frame. This arrangement has proven unpopular with people who have misplaced a wrench and have been unable to get the chair into a car until after the wrench was found or replaced.

A hollow stub axle with a laterally protruding spring-biased ball is inserted into a socket on the frame (see, for example, FIG. 3 of U.S. Pat. No. 5,060,962)—i.e., the stub axle acts as a single-acting ball-lock pin. The exterior surface of the hollow stub axle must be lubricated. This surface, which is exposed when the wheel is demounted, stains car upholstery.

Bergman, in U.S. Pat. No. 4,362,311, teaches a wheelchair in which stub axles extending from the hubs of main wheels are received in brackets having cooperating bifurcated legs.

Agrillo, in U.S. Pat. No. 4,758,013, teaches a wheelchair in which a collection of tubular members surrounding a stub axle are received in bifurcated slots extending from the wheelchair's frame.

SUMMARY OF THE INVENTION

A preferred embodiment of the invention provides apparatus for attaching a wheel system to a wheelchair at a predetermined one of a plurality of camber angles, where the angles differ by one or more predetermined angular measure (s), and where the wheel system comprises a wheel with bearings in a hub thereof and a stub axle (i.e., a non-rotating axle extending outwards from one side of the wheel). The apparatus comprises a bracket fixedly attached to, or integrally formed with, the wheelchair's frame as well as a plurality of axle retainers disposed about and juxtaposed along the stub axle, the retainers used to mount the axle in the bracket.

A preferred arrangement comprises three bushings slideably juxtaposed about a stub axle or extension thereof, one of the two possible pairings of the three bushings received in a bracket in each of two camber settings. Switching from a first of two predetermined camber angles to the second with this arrangement is a matter of removing the axle from the bracket, tilting and translating the axle either inboard or outboard (i.e., either toward or away from the center of the chair) by a predetermined amount, and reattaching the wheel to the chair.

The invention also provides a method and apparatus for attaching a wheel system to a wheelchair in which: a) there are no exposed lubricated surfaces of the apparatus to dirty a user's hands or to stain his or her automobile upholstery; and b) there are no tools or separate parts that need be carried by the user.

Some embodiments of the invention provide a spring-biased safety latch retaining a stub axle and an associated retainer in a mounting bracket. This latch provides a safety mechanism in the event that a main retaining means fails. The latch also captures and holds the axle in an approximately correct position in the bracket while the user shifts his or her hand positions during the process of attaching or demounting the wheel.

It is an overall object of the invention to provide means by which a wheelchair user can conveniently use the same chair for wheelchair sports that he or she uses inside a dwelling.

It is an additional object of the invention to allow the user of a wheelchair to easily and reproducibly select one of a plurality of camber angles for the main wheels of the chair.

It is a specific object of the invention to provide wheel attaching means allowing the main wheels of a wheelchair to be mounted to the chair at either of two predetermined camber angles, where the mounting operation is carried out without the use of separately carried tools.

It is an additional object of the invention to provide a wheel attaching method and apparatus for a wheelchair in which the detached wheel and stub axle have no exposed lubricated surface.

DETAILED DESCRIPTION

Figures 1A, 1B:
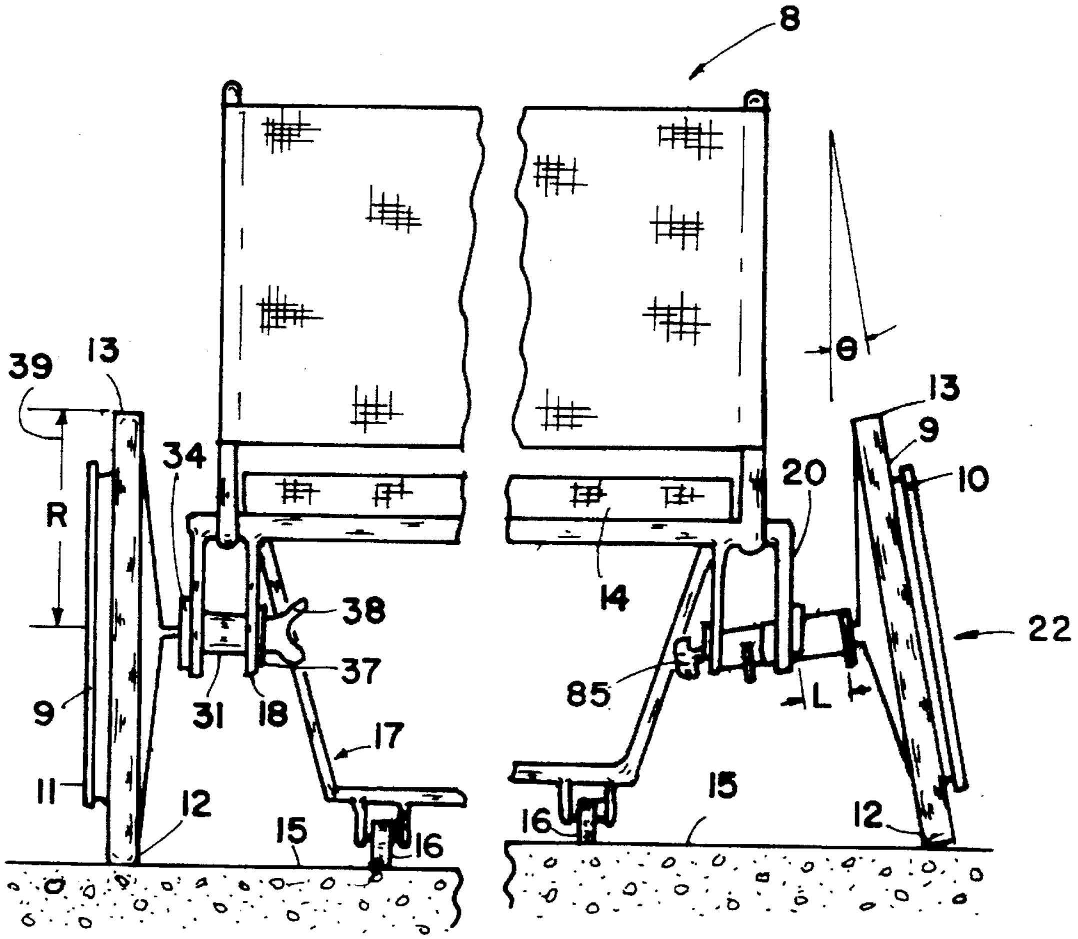
FIG. 1A PRIOR ART
FIG. 1A of the drawing is a rear elevational view of the left side of a wheelchair having its main wheel set in a vertical plane.
FIG. 1B of the drawing is a coordinated rear elevational view of the right side of the wheelchair of FIG. 1A, where the right main wheel is cambered by an angle designated as θ.

Turning to FIGS. 1A and 1B, one finds coordinated rear elevational views of a wheelchair 8 with one main wheel 9 set in a vertical plane and the other main wheel 9 cambered outward at the bottom 12 and inward at the top 13 by an angle θ. Because the two camber angles would not be used on one chair 8 at one time, and because a change in camber angle θ may be accompanied by a change in the height of the seat 14 above the terrain 15, FIG. 1A and FIG. 1B show a composite view. The chair 8 of FIGS. 1A and 1B includes a frame 17 from which an inboard bracket leg 18 and an outboard bracket leg 20 depend. A wheel system 22 including a main wheel 9 (preferably with a sealed bearing 24 in its hub 26 so that it can rotate about a stub axle 28) is clamped to bracket legs 18, 20 depending from the frame 17 below the seat 14. The camber angle θ is set with the aid of tubular axle retaining elements 30, as will be subsequently herein disclosed.

Although a tubular axle retainer 30 may be symmetrical about the axle 28 and used with bracket legs 18, 20 having equal length, so that the camber angle of the wheel 9 is the always the same (e.g., the uncambered wheel 11 of FIG. 1A that is attached to the chair 8 by means including a single axle retaining tubular element 31), in a manner similar to that depicted by Agrillo in U.S. Pat. No. 4,758,013 the present invention employs a plurality of axle retainers 30 to change the camber angle θ by demounting the wheel system 22, moving it inboard or outboard, and reattaching it to the wheelchair 8 by means of a bracket 40.

The camber change is preferably accompanied by a translation of the center of the wheel 9. If this is not done, the distance between the top 13 of the wheel 9 and the frame 17 will change. Since the distance between the tops 13 of the wheels 9 is matched to the user's shoulder width, this distance is preferably kept constant while the camber angle θ is varied. Thus, an ideal recambering operation on a wheelchair 8 will rotate the wheel system 22 about the top 13 of the wheel 9, or other nearby point such as the top of the push rim 10. The effective radius, R, of the wheel system 22 is normally measured from the center 33 of the axle 28 to the outermost part of a tire since the spacing between the tire sidewall and the side of the chair 8 is usually the critical controlled dimension.

Figure 2:
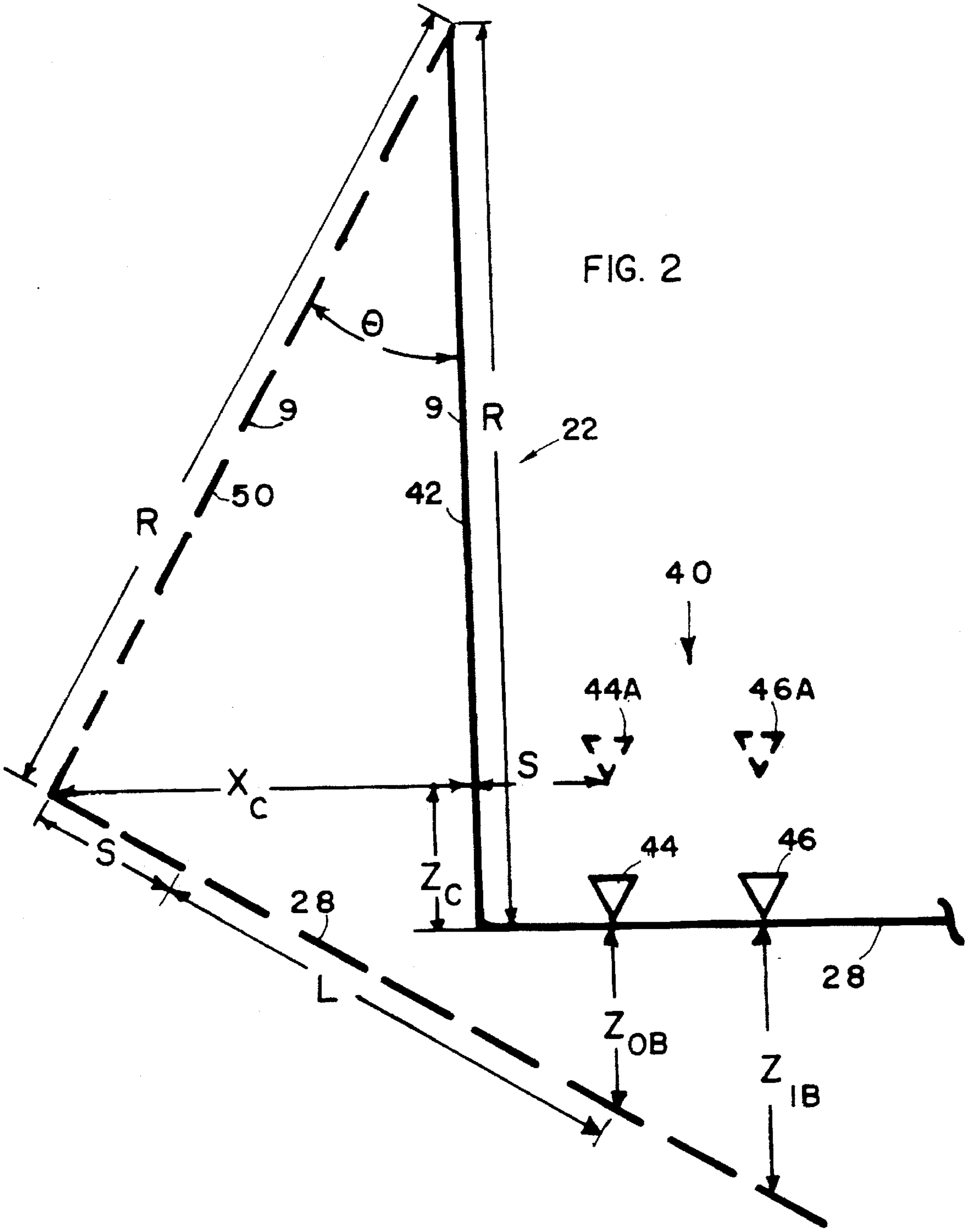
FIG. 2 of the drawing is a geometrical schematic of dimensional changes occurring on re-cambering a wheel while holding the top of the wheel at a fixed point in space.

The geometry of this situation is shown schematically in FIG. 2, where the initial setting of the wheel system 22 is indicated with solid bold lines 42 contacting a bracket 40 (indicated by triangles 44, 46) which has a minimum width denoted as W, the minimum width occurring when the bracket legs are flexed during a clamping operation. A second, cambered, setting of the wheel system 22 is indicated with dashed bold lines 50. In the interest of clarity of presentation, the cambering angular change, θ, depicted in FIG. 2 is greater than the maximum change of fifteen degrees or so used in practice. In FIG. 2 the effective radius of the wheel system 22 is labeled with a capital R; the standoff spacing (e.g., measured from the center of the hub 26 to the outboard leg 20 of a bracket) is labeled with a capital S; the horizontal and vertical displacements of the center of the hub 26 are labeled $x_C$ and $z_C$, respectively; and the vertical distances between the outboard leg 18 of the bracket 40 and the inboard leg 20 of the bracket 40 are denoted as $z_C$, $z_{OB}$, and $z_{IB}$, respectively.

Because the horizontal position of the outboard bracket leg 20 remains fixed, the stub axle 28 is translated along its axis by a distance denoted as "L". That is, L is the distance measured along the axis 33 of the axle 28 between a first point on the axle 28 immediately below the outboard bracket leg 20 when the wheel 22 is set at a first camber angle and a second point on the axle immediately below the outboard bracket leg 20 when the wheel 22 is set at a second camber angle. If the change in θ is small, this shift is negligible. For a significant change in camber (e.g., changing θ by 10° in going from an initial setting of 2° to a final setting of 12°) the required shift is about 5.3 cm for a wheel with an effective radius 39 of thirty centimeters. A trigonometric analysis of FIG. 2 shows L is equal to $R\tan\theta+S(\sec\theta-1)$. For reasonable values of the standoff distance, S, (e.g., S=5 cm), the second term in this expression is small, and L can often be approximated by $R\tan\theta$.

Increasing the camber angle, θ, can drop the rear of the seat 14 closer to the ground by the amount indicated as $z_C$ in FIG. 2 and thereby change the rake angle of the stem of the front caster wheels 16. This affects the handling characteristics of the chair 8, and may be deleterious if the magnitude of the changes are great enough. A vertical change in the effective bracket position compensating for this drop and thereby keeping the seat 14 level is depicted in FIG. 2 by phantom triangles 44A, 46A.

The apparatus of the invention provides both for translating the axle 28 along its axis, and for adjusting the effective lengths of the inboard 18 and outboard 20 legs of a bracket 40 used to hold the axle 28. This change in effective length may be done by physically changing the lengths of the legs 18, 20; by providing bearing surface portions 57, 58, 140, 142 on various of the tubular elements 30 (where the bearing surface portions 57, 58, 140, 142 are radially displaced from the axis 33 of the axle 28); or by combinations of the two techniques. The stub axle 28, as hereinafter described, may be a single element (e.g., a 7/16–20 bolt fitted within an inner sleeve through the hub 26, as is common in the prior art) or may be formed as a subassembly in which a first stub axle element 52 passing through the hub 26 is joined to a coaxial second axle element 53 (e.g., the arrangement depicted in FIG. 4 where an externally threaded first element 52 screws into a coaxial hollow second axle element 53).

As can be seen from the schematic of FIG. 2, the bracket legs 18, 20 need to increase in length by the amounts $z_{OB}$, and $z_{IB}$, respectively, to accommodate the cambered axle. An additional length change of magnitude $z_C$ may also be used to compensate for the height change associated with the change in camber angle. A trigonometric analysis of FIG. 2 indicates that $z_{OB}$ is equal to $2z_C$+Stanθ, and $z_{IB}$ is equal to $z_{OB}$+Wtanθ.

It will be appreciated that in some cases a designer may choose to ignore one or another of these shifts and accept small changes in the height of the seat 14, rake of the caster 16, etc. Such approximations may provide benefits such as lower cost or lower weight that render the dimensional inaccuracies acceptable. Thus, although the camber re-setting operation appears to call for changes in the height of both bracket legs 18, 20, providing an adjustable leg only at the inboard position may be adequate. Alternately, in cases where some lateral shifting of the top of the wheel 13 is tolerable, one could configure the apparatus of the invention with a single adjustable leg as the outboard bracket leg 20.

Figure 3:
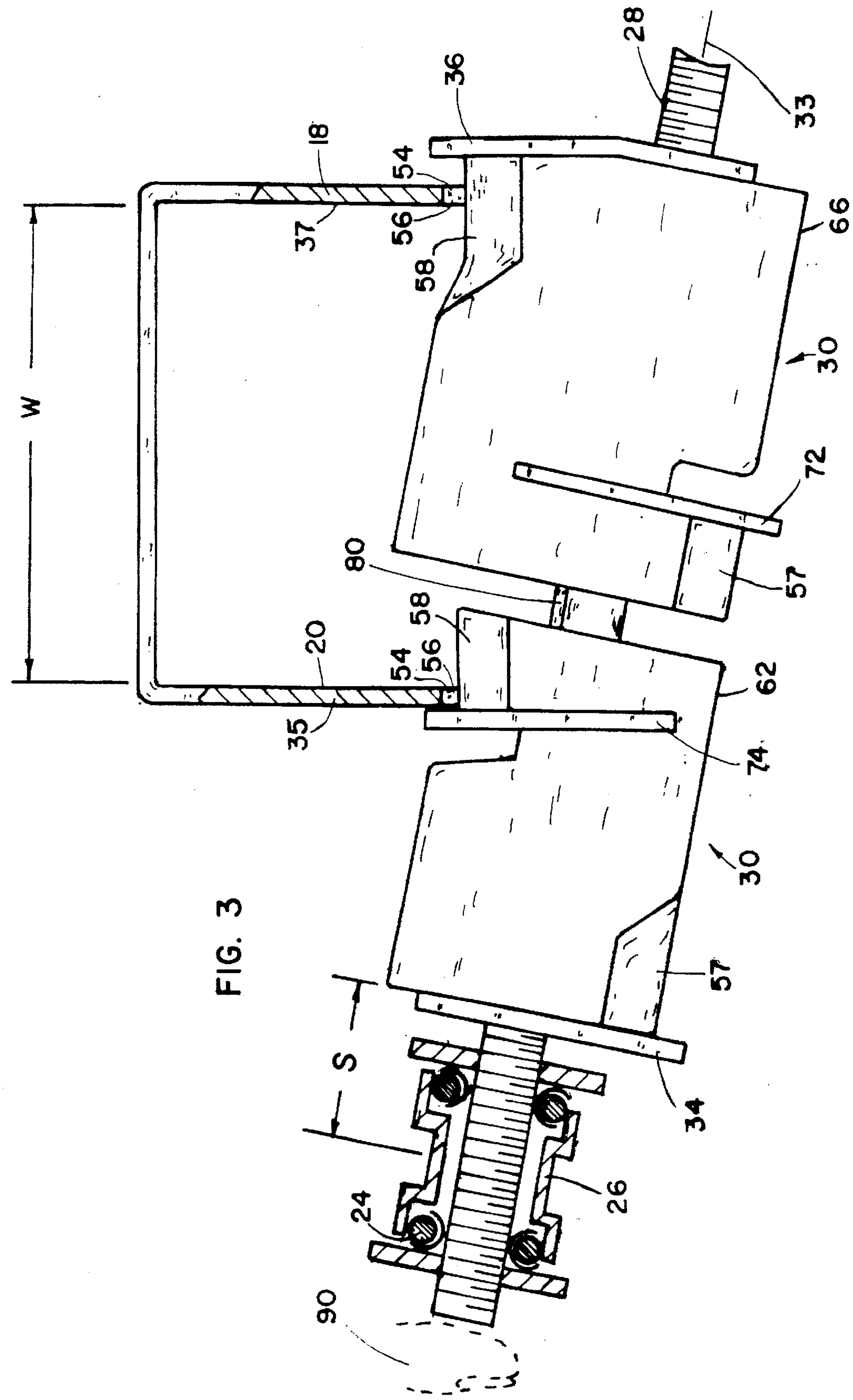
FIG. 3 of the drawing is a partly cut-away rear elevational view of an embodiment of the invention in which axle-retaining elements with slanted bearing surfaces clamp a wheel system to a bracket having two legs of fixed and equal lengths.

In one embodiment 60 of the invention, shown in FIG. 3, the bracket 40 has two depending bifurcated legs 18, 20 in which a bifurcating, downward-opening slot 54 has a relieved vee-shaped cut or surface 56 at its upper end. The slot 54 receives corresponding bearing surfaces 57, 58 formed on an exterior surface of a tubular axle retainer 30. The embodiment 60 is an example of one in which the bracket legs 18, 20 are of fixed length and all the dimensional changes are made by changing the radial distance between the axis of the axle 28 and the bearing surfaces 57.

The embodiment 60 of FIG. 3 uses two tubular retainers 30. One of these, hereinafter referred to as the "outboard nut" 62 is affixed to and prohibited from sliding along the axle 28 at a predetermined "standoff" distance, S, from the hub 26 of the wheel 9. The second tubular member in this embodiment 60 is an inboard bushing 66, which slides to and fro along the axle 28 during clamping and demounting. The dimensions of the nut 62 and bushing 66 may be chosen so that the distances between pairs of flanges 36, 74 and 34, 72 are the same and are slightly less than the outer width of the bracket 40, so that a clamping means 85 on the inboard end of the axle 28 can clamp the bracket, which is preferably highly rigid in the embodiment 60 of FIG. 3, between the nut 62 and bushing 66.

The inboard bushing 66 and outboard nut 62 may have one or more flanges 34, 36, 72, 74 (which may be attached to the tubular elements 30 by a variety of known methods, or may be integrally formed therewith). The outboard flanges 34, 72 on the nut 62 and bushing 66, respectively, are Generally more upstanding than are the corresponding inboard flanges 74, 36. For an uncambered setting the outboard flanges 34, 72, which are perpendicular to the axle 28 engage the exterior faces 35, 37 of equal length bracket legs 18, 20. For the cambered case shown in FIG. 3, the wheel 9 is translated outboard, the nut 62 and bushing 66 are rotated 180° about the axle 28, and the corresponding inboard flanges 74, 36 engage exterior faces 35, 37 of bracket legs 18, 20.

BACKGROUND OF THE INVENTION

In this embodiment 60 each tubular member 30 comprises a plurality of bearing surface portions 57, 58 associated respectively with a corresponding plurality of camber settings. The bearing surface portions 57, 58 on both nut 62 and bushing 66 are tilted with respect to each other by the angular measure associated with the desired camber change, and the radial distances from the axle axis 33 to those segments of the bearing surface portions 57, 58 that are immediately adjacent the flanges 34, 36, 72, 74 are chosen to provide the desired camber angle.

The less upstanding flanges 74, 36 are tilted with respect to the corresponding upstanding flanges 34, 72 by an angular measure equal to the desired change in camber angle. The preferred lateral shift is provided by appropriately spacing ones of the flanges 34, 36, 72, 74 along the axis 33 of the axle 28. This is done by setting the spacing L to be equal to the distance between two points where planes including the pair of bracket-engaging faces of the paired flanges (34, 74 and 36, 72) intercept the axle axis 33.

In order to ensure that properly paired ones of the bearing surfaces 57, 58 engage the bracket 40, the bushing 66 is preferably prohibited from rotating about the axle 28 independently of the nut 62. A variety of means are known for allowing the bushing 66 to slide to and fro along the axle 28 while maintaining a constant rotational orientation with respect to the nut 62. These include, inter alia, the key 174 and keyway 176 arrangement shown in FIG. 5 and the splined shaft 80 of FIG. 3.

Several preferred embodiments 82, 84 of the invention provide superior clamping by using structures mechanically analogous to clamping a bicycle wheel with a fixed axle length into a frame fork. The effective clampable bicycle axle length is normally defined by stop nuts, external to the wheel's axle bearings, on which the inner faces of the legs of the frame fork bear. This use of a fixed, essentially rigid, axle clamps each fork leg separately and allows for flexibility in the fork. As noted supra, the embodiment 60 of FIG. 3 requires a rigid bracket 40—if either of the legs 18, 20 of the bracket 40 flex toward the other leg 20, 18, the axle 28 may be released from the bracket 40.

Figure 4:
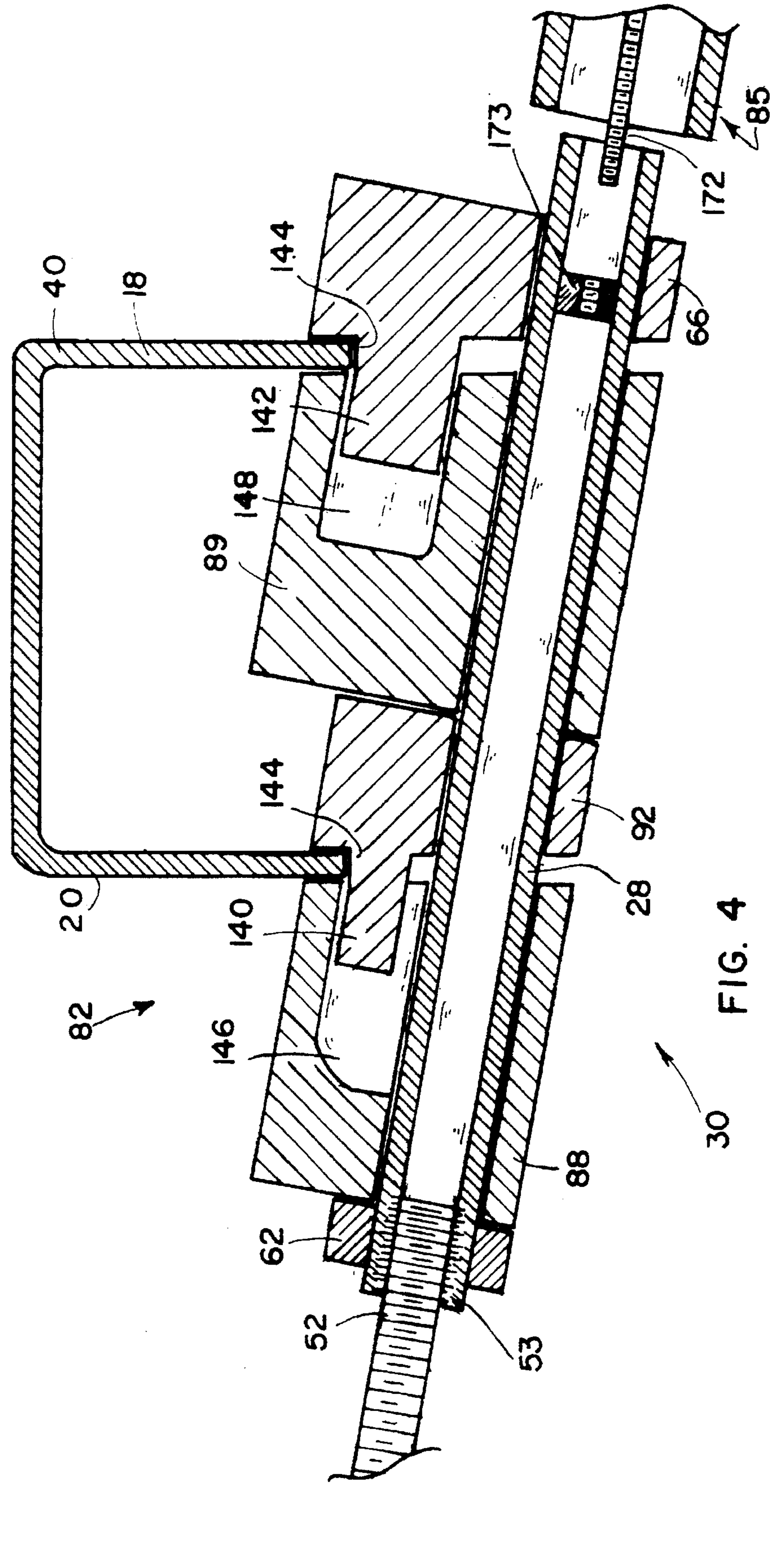
FIG. 4 of the drawing is a cross-sectional view of a preferred embodiment of the invention in which vertical adjustments associated with re-cambering are provided by means of bearing surfaces disposed on ones of a set of bushings juxtaposed along an axle, the bearing surfaces radially displaced from the axis of the axle by predetermined amounts.

Turning now to FIG. 4, one finds a cross-sectional view of a preferred embodiment 82 of the invention comprising four bushings 66, 88, 89, 89 and clamping means 62, 85, all disposed about a stub axle 28 and cooperating with a set of bracket legs 18, 20 having predetermined and equal lengths, to clamp the axle 28 into either of two settings. An important feature of the preferred embodiments 82, 84 is the provision of two translational bushings 88, 89 (each of which has a length equal to the chosen axial translation, L) and a middle bushing 92. In the uncambered setting the outboard translational bushing 88 and the middle bushing 92 are captured intermediate the legs 18, 20 of the bracket 40. In the cambered setting depicted in FIG. 4 the middle bushing 92 and the inboard translational bushing 89 are similarly captured while the outboard translational bushing 88 is outboard of the outboard bracket leg 20, thus providing the requisite axial translation. Because the lengths of the two translational bushings 88, 89 are equal and the middle bushing 92 is captured within the bracket in both settings, it is clear that the preferred embodiments 82, 84 provide a predetermined clampable length equal to the sum of the axial displacement, L, and the length of the middle bushing 92. This clampable length sets the minimum value, W, of the inside width of the bracket 40, which may comprise legs 18, 20 having appreciable flexibility for movement in an inboard or outboard direction (e.g., similar to the flexibility of the front fork of a bicycle that allows its legs to move inward and outward during clamping and unclamping operations).

Other arrangements can be made of tubular members 30 having lengths chosen so that combinations of the elements 30 provide a predetermined clampable length, each combination associated with a different one of a plurality of camber angles. Although the foregoing discussion has focused on what is expected to be the most common case in which a choice is made between one of two camber settings, other arrangements can permit three or more camber angles to be used. Turning now to FIG. 6, one finds a schematic depiction (in which artificially large cambering angles are used for clarity of presentation) of an array of tubular elements 30 usable with a variable leg length bracket 100 to allow selection of one of three camber angles. The array of tubular elements 30 of FIG. 6 comprises an outboard nut 62; a first pair of translational bushings 88A (labeled "A") having the same appropriately chosen length and having one set of pair of bracket-engaging flange faces perpendicular to the axis of the axle 28 (shown in FIG. 6 with a dash-dot line) and a second set of pair of flange faces tilted away therefrom by a first camber angle, $\theta_A$; a second pair of translational bushings 89A (labeled "B") both having a second appropriately chosen length and both having a first set of flange faces tilted by $\theta_A$ and a second set of flange faces tilted by a second camber angle, $\theta_B$; a middle bushing 92 (labeled "C") having one perpendicular flange face and one flange face tilted at $\theta_B$; and an inboard bushing 66 having an appropriately tilted outboard-facing flange face. The uncambered setting of the bracket 40, where the pair of bracket-engaging flange faces are tilted at zero degrees from a line perpendicular to the axle, is depicted by dashed phantom line 102. In this $\theta=0$ setting the bracket 40 captures elements labeled A, B, and C. In the setting cambered at $\theta_A$ (indicated with double-dotted dashed line 104) the bracket 40 captures B, C and A. In the setting cambered at $\theta_B$ (denoted with triple-dotted dashed line 106) the bracket 40 captures C, A, and B. That is, all three settings provide that the bracket 40 captures an array of tubular elements having the same clampable length. It may be noted that if one were to fuse each translational bushing 88A, 89A with its nearest neighboring translational bushing 89A, 88A, and erase the intermediate bracket setting indicated by the dash-dot line 104, the new schematic so generated would represent a preferred two-angle cambering arrangement such as that depicted in FIG. 5. Correspondingly, providing additional translational bushings according to the scheme shown in FIG. 6 could provide the user with a choice of a greater number of camber angles.

Figure 5:
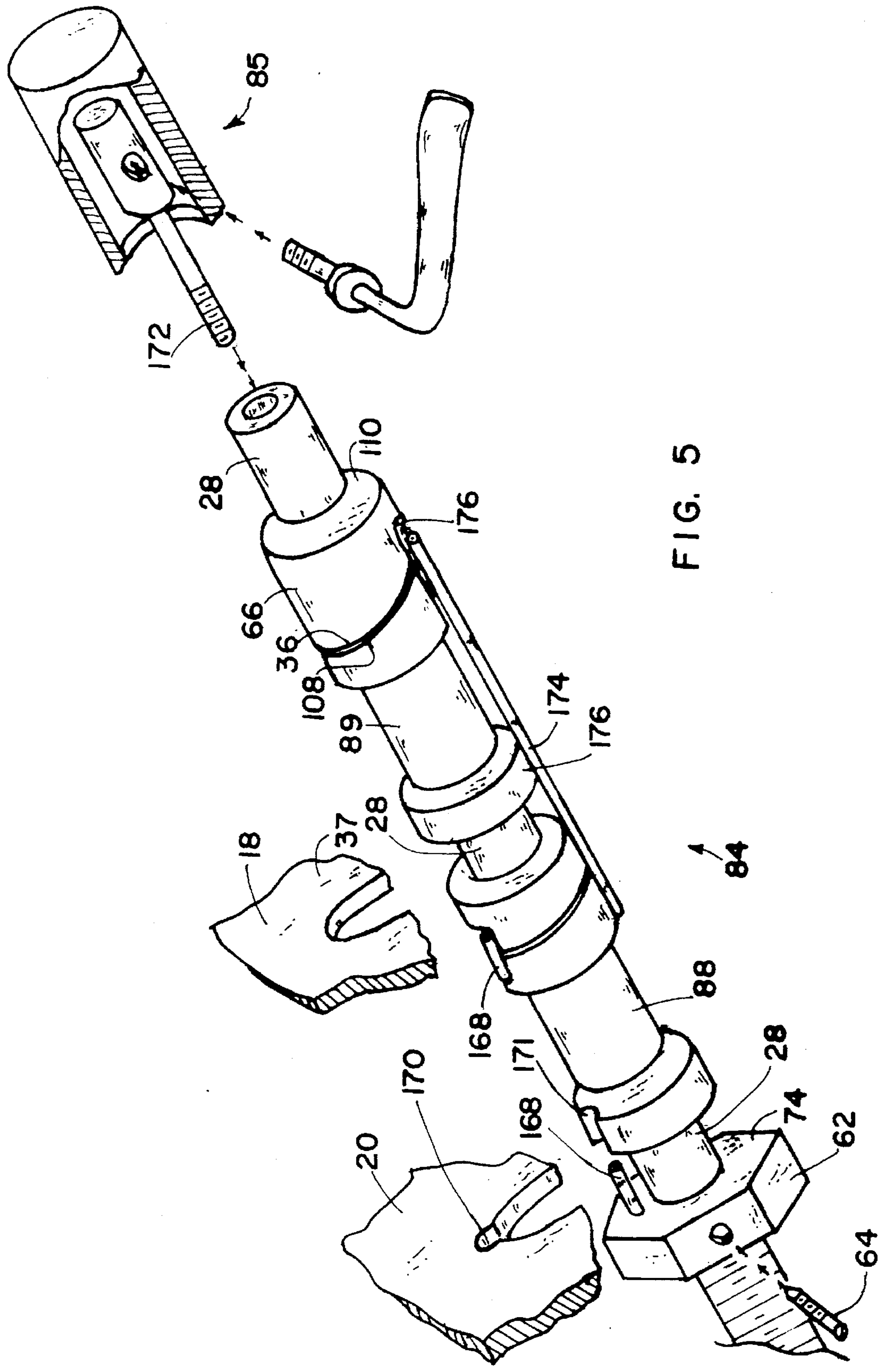
FIG. 5 of the drawing is a partially exploded and partially cut-away view of an array of tubular elements usable with a variable leg length bracket to select one of two predetermined camber angles.
Figure 6:
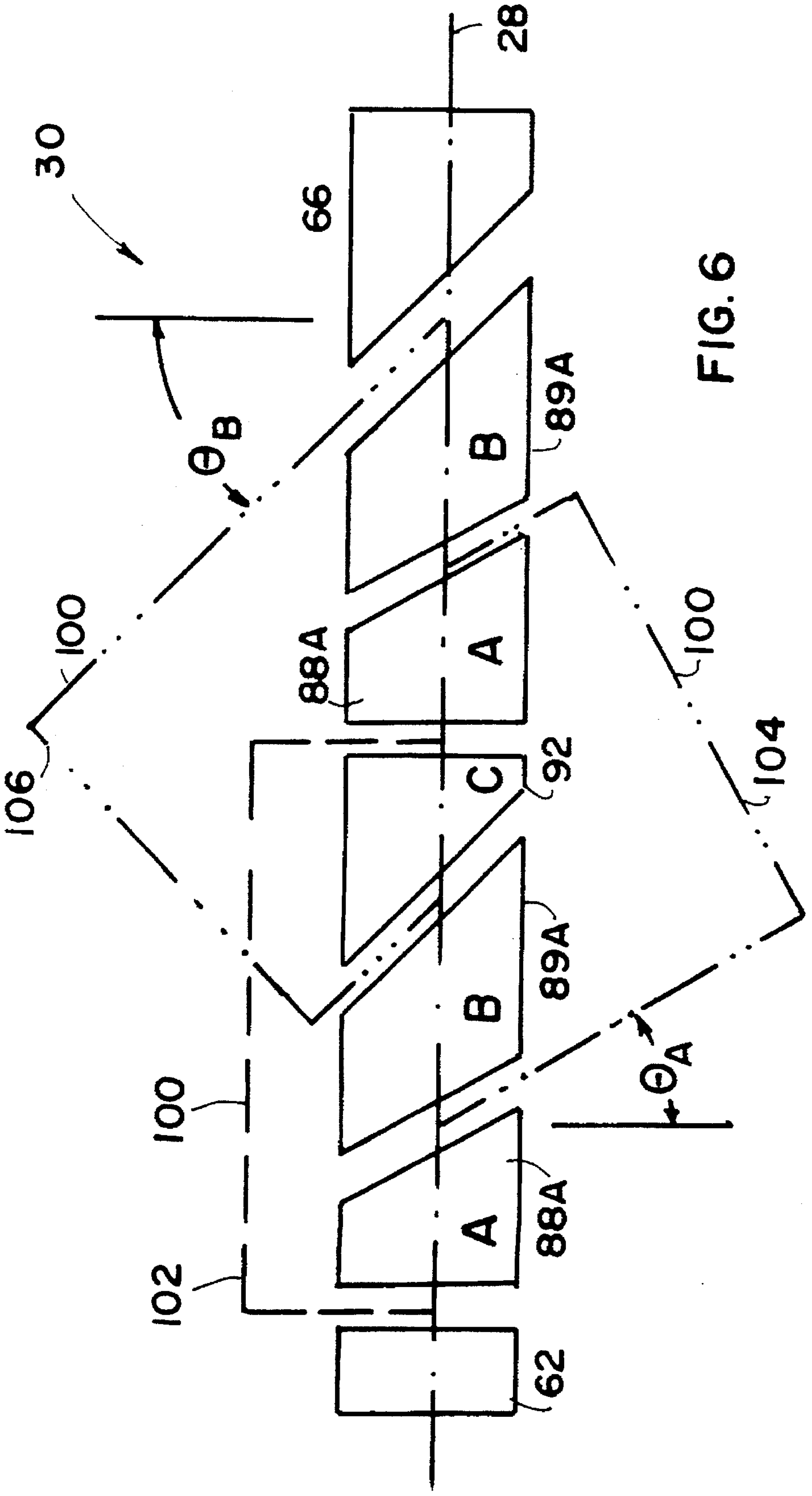
FIG. 6 of the drawing is a schematic view of a plurality of tubular elements used with a variable leg length bracket to select one of three predetermined camber angles.

The preferred embodiment 84 depicted in FIG. 5 also comprises an outboard nut 62, an inboard bushing 66 and a clamping means 85. The outboard nut 62 is affixed to the axle 28 at a predetermined standoff distance, S, from the hub 26. The nut 62 provides an inboard-facing flange face 74 engaging the outer face 35 of the outboard bracket leg 20 in the uncambered setting and is preferably rotationally locked to the other tubular elements 30. As will become clear in the following disclosure, the outboard nut's 62 function of providing a fixed outboard point for the clamping arrangement may be supplied by other equivalent structural elements (e.g., a collar shrunk or welded onto the outside of the axle tube 28), all of which will be embraced by the term "nut" herein to set these elements off from other tubular elements 30 that can slide to and fro along the axle 28 and that are herein referred to as "bushings". The inboard bushing 66 provides a flange face 36 engaging the inboard face 37 of the inboard bracket leg 18 in the cambered setting and bearing on a mating flange surface 108 on a translational bushing 89 when the wheel 22 is uncambered. The inboard bushing 66 has an inboard-facing face 110 perpendicular to the axle 28 so as to conveniently engage a conventional washer, drive nut, or other clamping means 85 providing a clamping force along the axis of the axle 28.

As stated supra, various vertical displacements can be accommodated either in the bracket leg or in the radial extent of the tubular elements 30. In the embodiment 82 depicted in FIG. 4, the bracket legs 18, 20 have fixed and equal lengths. In the uncambered setting the legs 18, 20 bear directly on the external surface of the axle tube 28. In the cambered setting the legs 18, 20 bear on radially displaced surface portions 140, 142 of the middle bushing 92 and the inboard bushing 66, respectively, and the surface portions 140, 142 extend into cavities 146, 148 in the outboard and inboard translational bushings 88, 89, respectively. Because the same bracket surfaces are used in both settings, it is preferred to provide an appropriately angled portion 144 of the radially displaced bearing surfaces 140. 142 to ensure good contact in the cambered case. It will be understood that various modifications of the apparatus of FIG. 4 can be made. For example, if one chose to ignore the height change at the outboard bracket leg 20, the leg 20 could be allowed to bear directly on the axle tube 28 in both settings, thus allowing the use of a smaller and lighter outboard translation bushing 88 and middle bushing 92. Additionally, it is clear that the radially displaced bearing surfaces 140, 142 could as well be made as part of the translational bushings 88, 89, with appropriate mating cavities 146, 148 formed in the middle and inboard bushings. It is further noted that rotating the axle 28 and its associated array of tubular elements 30 through a half turn (a step necessary in the embodiment 60 depicted in FIG. 3) is not required when using the embodiment 82. Control of the rotational setting of the axle (as depicted in FIG. 3 by having the user place his or her thumb 90 on a portion of the axle 28 extending outward of the hub 26), is needed in the embodiment 82 to ensure proper contact with the bracket legs 18, 20.

Figure 7:
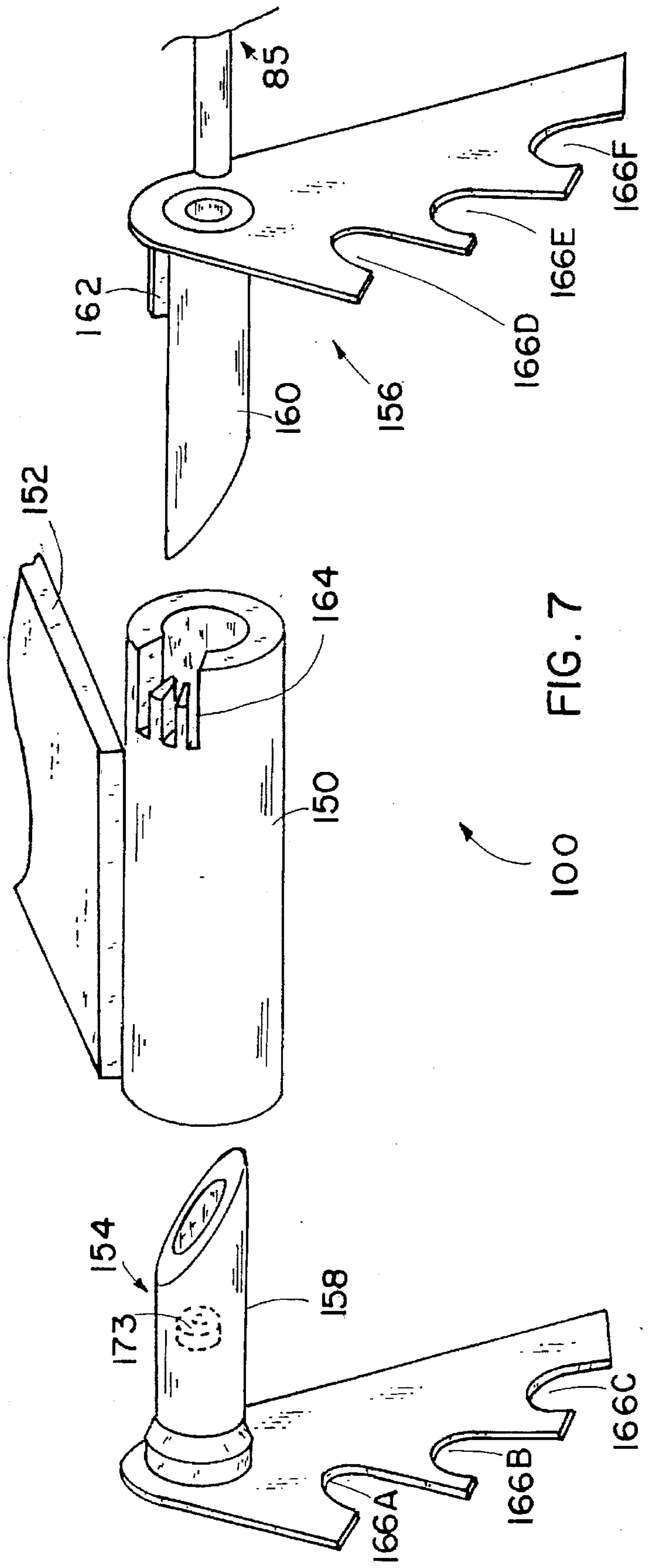
FIG. 7 of the drawing is an exploded perspective view of a variable leg length bracket.

In another preferred embodiment 84 the changes in height at the bracket legs 18, 20 are accommodated with a variable leg-length bracket 100. One version of a variable leg-length bracket 100 is depicted in FIG. 7. This bracket 100 comprises a cylindrical sleeve 150 affixed to the wheelchair frame 17 (e.g., by being welded to a plate 152 bolted to a mating plate (not illustrated) on the frame 17) and a set of leg subassemblies 154, 156, each of which comprises a cylindrical member 158, 160, rotating within the sleeve 150. The two leg subassemblies 154, 156 are rotationally locked against independent rotation and may pivot together about the axis of the sleeve 150 among a plurality of settings, each of which corresponds to a different camber setting of the wheel system 22. The variable bracket 100 can be locked into each of the predetermined camber settings by means such as the combination of a key 162 on the inboard bracket leg assembly 156 and a mating set of slots 164 on the sleeve 150. Because the bearing surfaces 166A–166F correspond to differing camber settings, each of the pairs (i.e., 166A, 166D; 166B, 166E; and 166C, 166F) bears on the axle tube 28 at a different predetermined angle. Hence, it is expected that the bearing surfaces 166A–F will be cut at appropriate and differing angles. Although FIG. 7 depicts a bracket 100 having three pivotal settings, it is expected that two settings will be used in most cases which will reduce the fore and aft width of the legs 254, 256 (i.e., as measured in a plane perpendicular to the axis of the sleeve 250) and thereby reduce the clearance required for installing the pivoting bracket 100.

Figure 8:
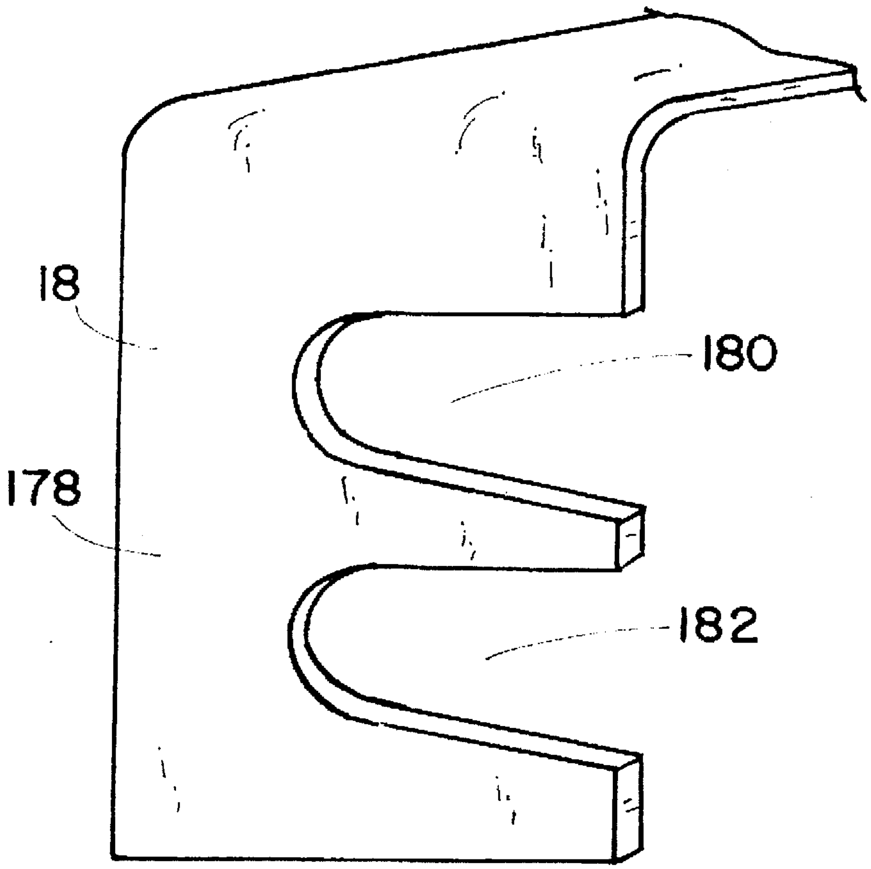
FIG. 8 of the drawing is an elevational view of a bracket leg having two laterally bifurcated slots.

It will be appreciated that a variety of other means of changing the length of a bracket (e.g., by inserting shims or tabs (not shown) into the bifurcated slots 54 of a fixed leg bracket 40) may also be used in practicing the invention. One could, for example, use an inboard bracket leg 178 having two laterally-opening bifurcated slots 280, 282. In a leg 178 of this sort, as depicted in FIG. 8, each slot 280, 282 is associated uniquely with one of two camber angle settings. Although structurally simple, the minimum vertical displacement that can be provided with a dual-slotted leg 178 is greater than the minimum available with an adjustable leg bracket 100. Because the vertical adjustment is larger, the bracket must be wider, and therefore the seat 24 must be wider to maintain adequate transverse clearance between the inboard ends of the right and left stub axles 28 (which are coaxial when a zero camber angle is selected).

An array of tubular elements 30 usable with a variable leg length bracket having two settings is depicted in FIG. 5. In this depiction the outboard nut 62, affixed to the axle 28 by a set screw 64, comprises a stud 168 that mates either with a cut-out 170 in the outboard bracket legs 20 or with a keyway 171 in the outboard translation bushing 88, the disposition of the stud 168 depending on the choice of camber setting. This stud 268 serves both to prevent the various tubular elements 30 from rotating together about the axle 28 when the cammed screw 172 or other clamping means 85 is tightened, and also to rotationally lock the outboard nut 62 to the outboard translation bushing 88. A similar stud 168 on the inboard face of the outboard translation bushing 88 keeps the tubular elements 30 from rotating about the axle 28 during the clamping operation. In the depiction of FIG. 5 the various bushings 66, 88, 89, 92 are rotationally locked by means of an extended key 174 affixed to the outboard translational bushing 88 and sliding within keyways 176 cut into the bottom of each of the other bushings 66, 89, 92.

A desirable clamping means 85 operates without the use of separately carried tools and may comprise a cammed fastener using a camming lever rotatable within a through-hole (not shown) in the axle 28 to urge a cylindrical member against the inboard bracket leg 18, e.g., as taught by Nicols et al. in U.S. Pat. No. 4,971,397, the disclosure of which is herein incorporated by reference. More conventionally, the clamping means 85 may be a deep-throated version of a well-known cammable fastener having a screw 172 engaging a nut 173 affixed within the hollow axle tube 28. When the clamping fastener 85 is loosened, the various tubular elements 30 may optionally be urged slightly apart by a spring (not shown) so as to make it easier for the user to re-insert the wheel system 22 into the bracket 40 without being bothered by interferences.

When the clamping element 85 moves along the axle 28 it may apply a force to a bracket leg 18, 20 that is not normal to one of the flange faces thereof. Moreover, because the preferred embodiments 82, 84 comprise pluralities of bushings 88, 88A, 89, 89A, 92 clamped intermediate the legs of a bracket 40, clamping in a cambered setting (i.e., when θ has a non-zero value) involves shearing forces intermediate ones of the bushings. Undesired slippage may be controlled by known expedients, such as providing corresponding tongue and groove elements on mating surfaces (not shown), by using robust keys 174 and keyways 176, or by selecting appropriate clearances between the axle 28 and ones of the bushings 88, 88A, 89, 89A, 92.

The bracket and retainer arrangements discussed supra provide the desired benefits of a selectable camber angle, as well as providing means of attaching a wheel system 22 to a chair 8 in which the exposed surfaces of the wheel system 22 are unlikely to be coated with a lubricant. Only small portions of lubricated surfaces, such as the outer surface of the axle 28, are exposed to view and these are shielded from contact by adjacent flange faces.

Attaching a wheel 9 to a chair 8 using only the foregoing elements of the apparatus may require a good sense of balance or a third hand. Putting a wheel 9 on a chair 8 requires holding the frame 17 with one hand, picking up the wheel 9 (with due regard for rotational alignment of tubular elements 30) with the other hand, inserting the axle 28 and tubular elements 30 into a bracket 40, and balancing the frame 17 on the wheel 9 in order to free one hand to operate the clamping means 85. A preferred embodiment provides a latch 112 adjacent the inboard bracket leg 18 to hold the wheel system 22 in place while moving one's hand from the wheel 9 to the nut 38.

Figure 9:
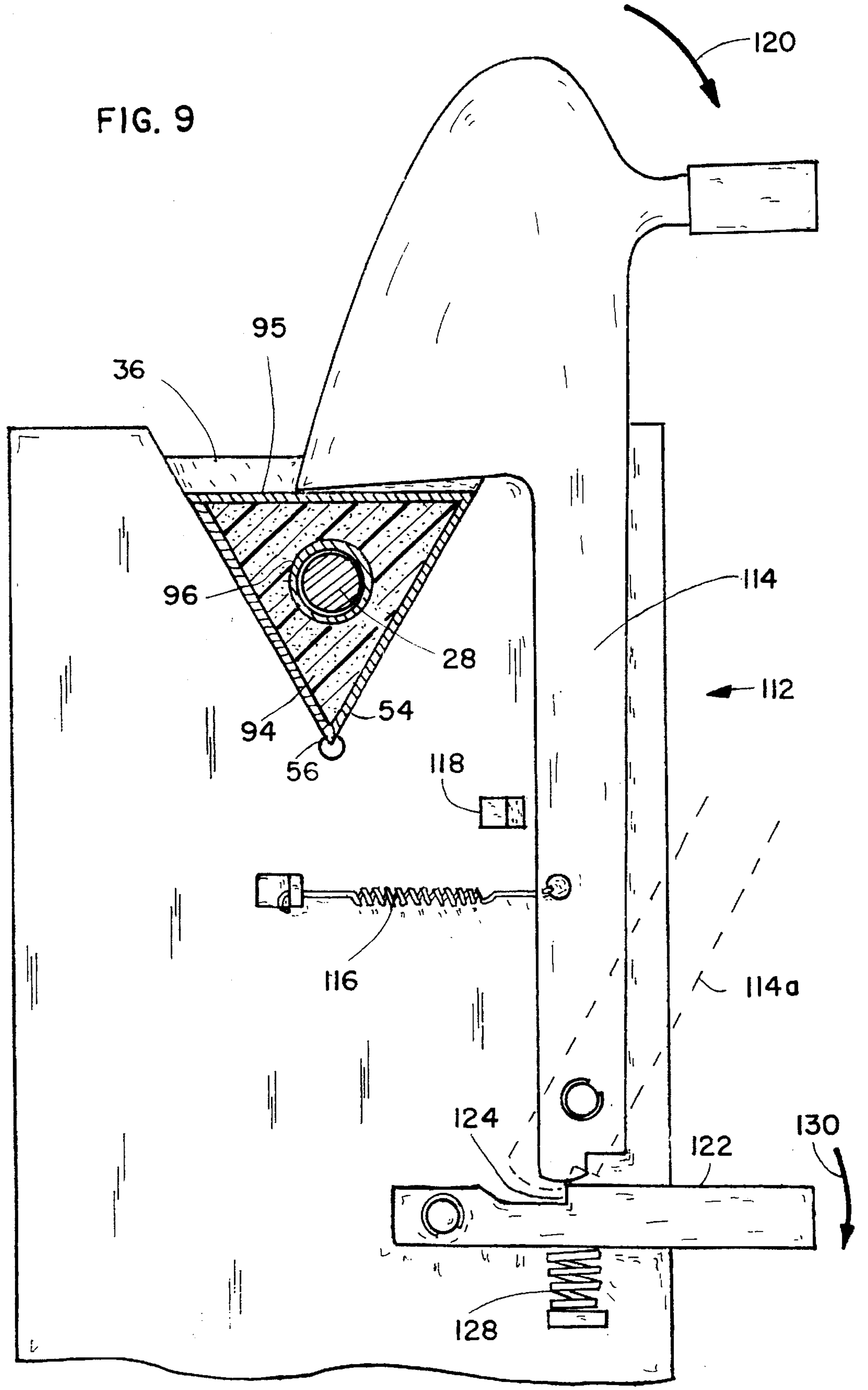
FIG. 9 of the drawing is a partial elevational view of the outboard face of an inboard leg of a bracket showing a latching mechanism retaining a three-lobed tubular element.

A latch 112, as shown in FIG. 9, may comprise a spring-biased hook 114 held in an axle-retaining position by a bias spring 116. In this position the latch 112 can be used not only to hold the wheel system 22 in position during the wheel attachment operation, but can also serve as a safety mechanism retaining the axle 28 in an approximately correct attitude if the primary clamping means 85 becomes loosened. When the wheel system 22 is taken off an upright chair 8 (e.g., by loosening a capnut 38, pushing the hook 114 away from the slot 54 and allowing the wheel system 22 to fall loose under the influence of gravity), the hook 114 is held against a stop 118. When the wheel system 22 is subsequently to be reattached to the chair 8, the user can turn the chair upside down, position the wheel system 22 to place an appropriate element 62, 88 adjacent the outboard surface 35 of the outboard bracket leg 20 and then push the axle 28 and bushing 66 against the hook 114, thus urging it away from the slot 54 (as indicated by the arrow 120 in FIG. 9) and thereby allowing the axle 28 to slip into place for clamping.

Optionally, if one wishes to remove the wheel system 22 when the chair 8 is in an inverted position in which gravity will not dump the axle 28 out of the slot 54, one may supply a latch hold-open mechanism, which may include a spring-biased trigger 122 shown in FIG. 9, engaging a sear 124 in the locking hook 114 when the hook 114 is rotated into the open position indicated in phantom as 114*a* in FIG. 9. The hook 114*a* can be released by manually rotating the trigger 122 against the force of its bias spring 128 in the direction indicated with arrow 130 in FIG. 9.

Although one could provide a latch 112 adjacent either an inboard 18 or outboard 20 bracket leg, the preferred embodiment places the hook 114 adjacent the inboard leg 18. The outboard bracket leg 20 serves as a fulcrum, or center of rotation, of the wheel system 22 about the bracket 20 both when the chair 8 is inverted and the system 22 is being clamped in place, and when the chair 8 is in use. Thus, a latch hook 114 adjacent the outboard leg 20 would be far less useful. One can, of course, make more complex latches with hooks 114 at both locations, or at intermediate locations.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is desired to be secured by Letters Patent is:

1. Apparatus for attaching a wheel system comprising a wheel and a stub axle to a wheelchair at one of a plurality of camber angles, the apparatus comprising:

a bracket extending from the wheelchair, the bracket having inboard and outboard bifurcated legs, the length of one of the legs selectable from a plurality of predetermined leg lengths, each of the leg lengths respectively associated with one of the camber angles;

a plurality of tubular members juxtaposed along the axle, the tubular member closest to the wheel prohibited from sliding along the axle, the other tubular members slideably disposed on the axle;

a plurality of pairs of bracket-engaging faces, each of the pairs of bracket-engaging faces comprising respective exterior surface portions of two different ones of the tubular members, each of the pairs of faces tilted with respect to a line perpendicular to the axle by one of the predetermined camber angles; and clamping means clamping the bracket legs between ones of the pairs of bracket-engaging faces.

2. Apparatus of claim 1 wherein the length of the inboard bifurcated leg is selectable from a first and a second length.

3. Apparatus of claim 1 wherein one of the tubular members comprises a bearing surface portion spaced a predetermined radial distance from the axle, the bearing surface portion interposed between one of the bracket legs and the axle when the wheel system is attached at a predetermined one of the camber angles.

4. Apparatus of claim 1 wherein the difference between two of the predetermined leg lengths is equal to an algebraic product formed by multiplying the tangent of the angular difference between the two respective camber angles by a width of the bracket.

5. Apparatus of claim 1 wherein two of the tubular members have a predetermined axial length equal to a distance between a first point on the axle immediately below the outboard bracket leg when the wheel is attached at a first of the camber angles and a second point on the axle immediately below the outboard bracket leg when the wheel is attached at a second of the camber angles, and wherein a clampable length between the bracket legs is equal to the sum of the predetermined axial length and an axial length of a third of the tubular members.

6. Apparatus of claim 1 wherein each of the bracket legs is separately clamped between one of the pairs of bracket-engaging faces.

7. Apparatus of claim 1 wherein the bracket comprises a cylindrical sleeve having a horizontal axis transverse to the wheelchair and wherein the leg having a selectable length comprises a tubular portion disposed within the sleeve for pivotal motion about the axis thereof, the leg further comprising two bearing surface portions, each of the two bearing surface portions spaced a respective one of the predetermined leg lengths from the axis of the sleeve.

8. Apparatus of claim 1 further comprising a latch, the latch comprising a first rotatable latch member biased by a first latch spring into a latched position wherein the first latch member retains the axle within the bracket, the first latch member rotating into an open position wherein the first latch member does not retain the axle within the bracket, and a second latch member biased by a second latch spring into a locked-open position wherein the second latch member coacts with the first latch member to hold the first latch member in the open position, the second latch member moving against the biasing force of the second latch spring to release the first latch member from the open position, the first latch member thereupon moving from the open to the latched position.

9. Apparatus attaching a wheel system comprising a wheel and a stub axle to a wheelchair at one of a plurality of predetermined camber angles, the apparatus comprising:

a bracket extending from the wheelchair, the bracket having inboard and outboard bifurcated legs;

a plurality of tubular members juxtaposed along the axle, the tubular member closest to the wheel prohibited from moving along the axis of the axle, the other tubular members slideably disposed on the axle, one of the tubular members comprising a bearing surface portion spaced a predetermined radial distance from the axle, the bearing surface portion interposed between one of the bracket legs and the axle when the wheel system is attached at a predetermined one of the camber angles;

a plurality of pairs of bracket-engaging faces, each of the pairs of bracket-engaging faces comprising respective exterior surface portions of two different ones of the tubular members, each of the pairs of faces tilted with respect to a line perpendicular to the axle by one of the predetermined camber angles, and clamping means clamping each of the bracket legs between ones of the pairs of bracket-engaging faces.

10. Apparatus of claim 9 wherein a second of the tubular members comprises a second bearing portion spaced a second predetermined radial distance from the axle, the second bearing surface interposed intermediate the axle and the other of the bracket legs when the wheel system is attached at the predetermined one of the camber angles.

11. Apparatus of claim 9 wherein each of the bracket legs is separately clamped between one of the pairs of bracket-engaging faces.

12. Apparatus of claim 9 wherein the length of one of the bracket legs is selectable from a plurality of predetermined leg lengths, each of the leg lengths associated with one of the camber angles.

13. Apparatus of claim 9 further comprising a latch, the latch comprising a first rotatable latch member biased by a first latch spring into a latched position wherein the first latch member retains the axle within the bracket, the first latch member rotating into an open position wherein the first latch member does not retain the axle within the bracket, and a second latch member biased by a second latch spring into a locked-open position wherein the second latch member coacts with the first latch member to hold the first latch member in the open position, the second latch member moving against the biasing force of the second latch spring to release the first latch member from the open position, the first latch member thereupon moving from the open to the latched position.

* * * * *